United States Patent
Ree et al.

(10) Patent No.: US 8,537,029 B2
(45) Date of Patent: Sep. 17, 2013

(54) SYSTEMS, METHODS, AND APPARATUS FOR FACILITATING UTILITY METER COMMUNICATION

(75) Inventors: Bradley Richard Ree, Cumming, GA (US); Ryan Marc LaFrance, Marietta, GA (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 13/100,759

(22) Filed: May 4, 2011

(65) Prior Publication Data

US 2012/0280829 A1   Nov. 8, 2012

(51) Int. Cl.
*G08B 23/00* (2006.01)

(52) U.S. Cl.
USPC ............ 340/870.02; 340/870.03; 379/100.04; 379/106.03; 709/218; 709/232; 709/233; 709/239; 709/243

(58) Field of Classification Search
USPC .................. 340/870.02–870.03; 379/100.04, 379/106.03; 709/208, 232, 233, 239, 240, 709/243
See application file for complete search history.

(56) References Cited

U.S. PATENT DOCUMENTS

| | | | |
|---|---|---|---|
| 7,769,888 B2 * | 8/2010 | Flammer et al. | 709/238 |
| 7,917,251 B2 * | 3/2011 | Kressner et al. | 700/286 |
| 2006/0071813 A1 | 4/2006 | Kagan | |
| 2009/0138547 A1 * | 5/2009 | Boudreau | 709/203 |
| 2011/0029655 A1 | 2/2011 | Forbes, Jr. et al. | |

OTHER PUBLICATIONS

Search Report and Written Opinion for European Patent No. 12166472.6 dated Aug. 10, 2012.

* cited by examiner

*Primary Examiner* — Albert Wong
(74) *Attorney, Agent, or Firm* — Sutherland Asbill & Brennan LLP

(57) ABSTRACT

Systems, methods, and apparatus for facilitating utility meter communication are provided. One or more communications to be transmitted by a utility meter may be identified by the utility meter. A cost associated with the transmission of the one or more communications may be determined by the utility meter, and a determination may be made as to whether the cost satisfies one or more cost parameters. If it is determined that the cost satisfies the one or more cost parameters, the one or more communications may be transmitted by the utility meter. If, however, it is determined that the cost does not satisfy the one or more cost parameters, the one or more communications may be stored by the utility meter for subsequent transmission.

20 Claims, 3 Drawing Sheets

SYSTEMS, METHODS, AND APPARATUS FOR FACILITATING UTILITY METER COMMUNICATION

FIELD OF THE INVENTION

Embodiments of the invention relate generally to utility meters, and more specifically to systems, methods, and apparatus for facilitating utility meter communication.

BACKGROUND OF THE INVENTION

A wide variety of utility meters are configured to transmit messages and/or other communications. For example, smart meters are configured to transmit messages containing consumption data and/or other monitoring data. With any communication network or communication technique that may be utilized by a utility meter, there is a cost associated with each communication or message. For example, a bandwidth cost, data transmission cost, and/or power cost may be associated with a communication. Additionally, cost variations may exist based upon the time of day. For example, a communication network may include peak rates and off-peak rates. Given the wide variety of different costs that may be associated with utility meter communications, there is an opportunity for cost saving methods for utility meters that transmit messages.

BRIEF DESCRIPTION OF THE INVENTION

Some or all of the above needs and/or problems may be addressed by certain embodiments of the invention. Embodiments of the invention may include systems, methods, and apparatus for facilitating utility meter communication. According to one embodiment of the invention, there is disclosed a method for processing utility meter communications. One or more communications to be transmitted by a utility meter may be identified by the utility meter. A cost associated with the transmission of the one or more communications may be determined by the utility meter, and a determination may be made as to whether the cost satisfies one or more cost parameters. If it is determined that the cost satisfies the one or more cost parameters, the one or more communications may be transmitted by the utility meter. If, however, it is determined that the cost does not satisfy the one or more cost parameters, the one or more communications may be stored by the utility meter for subsequent transmission.

According to another embodiment of the invention, there is disclosed a utility meter that is configured to process communications. The utility meter may include at least one network interface device, at least one memory, and at least one processor. The at least one network interface device may be configured to facilitate transmission of one or more communications. The at least one memory may be configured to store computer-executable instructions. The at least one processor may be configured to access the at least one memory and execute the computer-executable instructions to: identify one or more communications to be transmitted by the utility meter; determine a cost associated with the transmission of the one or more communications; determine whether the cost satisfies one or more cost parameters; and direct, if it is determined that the cost satisfies the one or more cost parameters, transmission of the one or more communications by the at least one network interface; or direct, if it is determined that the cost does not satisfy the one or more cost parameters, storage of the one or more communications in the at least one memory for subsequent transmission.

Additional systems, methods, apparatus, features, and aspects are realized through the techniques of various embodiments of the invention. Other embodiments and aspects of the invention are described in detail herein and are considered a part of the claimed invention. Other embodiments, features, and aspects can be understood with reference to the description and the drawings.

BRIEF DESCRIPTION OF THE DRAWINGS

Figure 1:
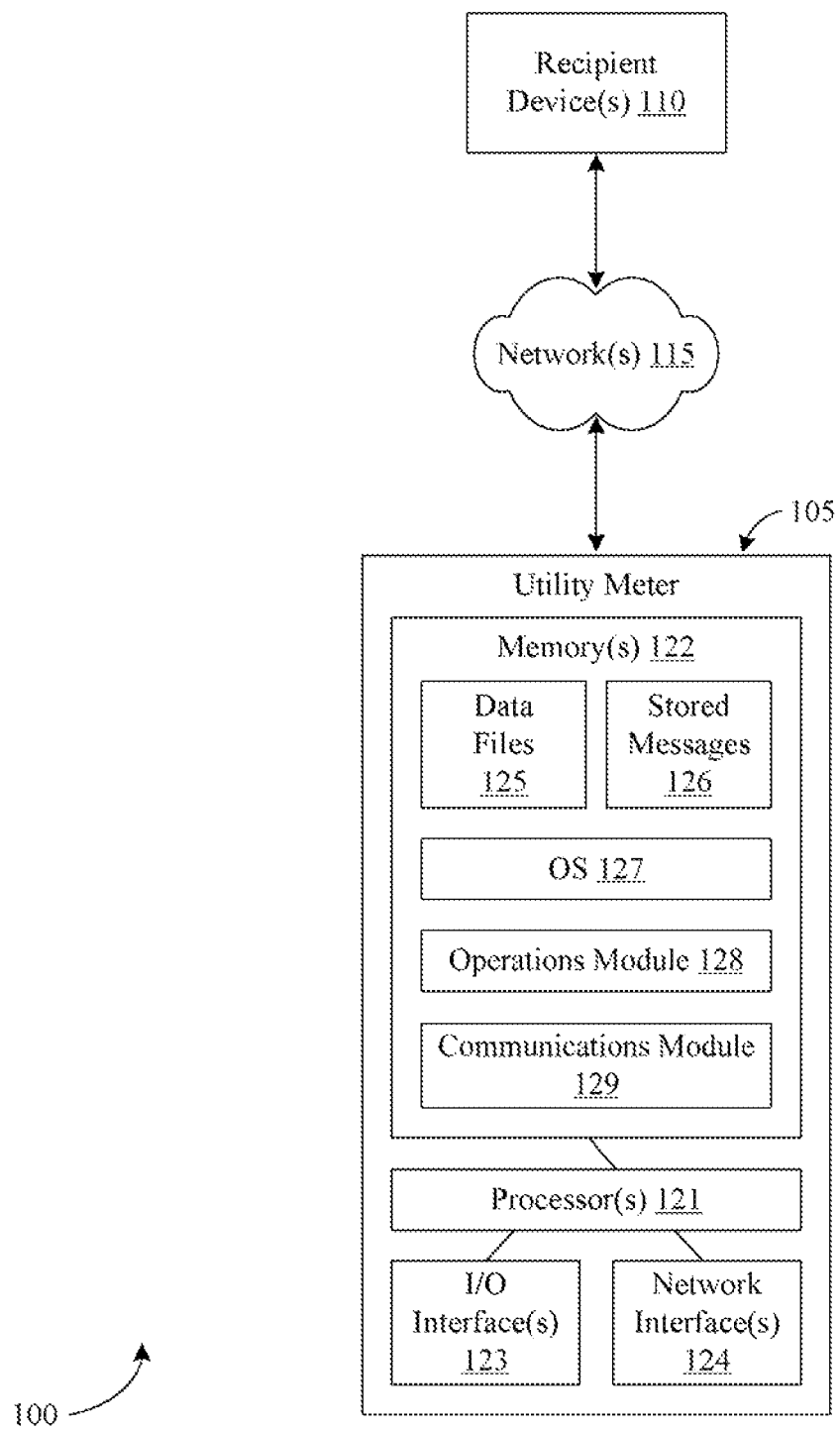

Having thus described the invention in general terms, reference will now be made to the accompanying drawings, which are not necessarily drawn to scale, and wherein:

FIG. 1 is a block diagram of one example system that facilitates utility meter communication, according to an illustrative embodiment of the invention.

Figure 2:
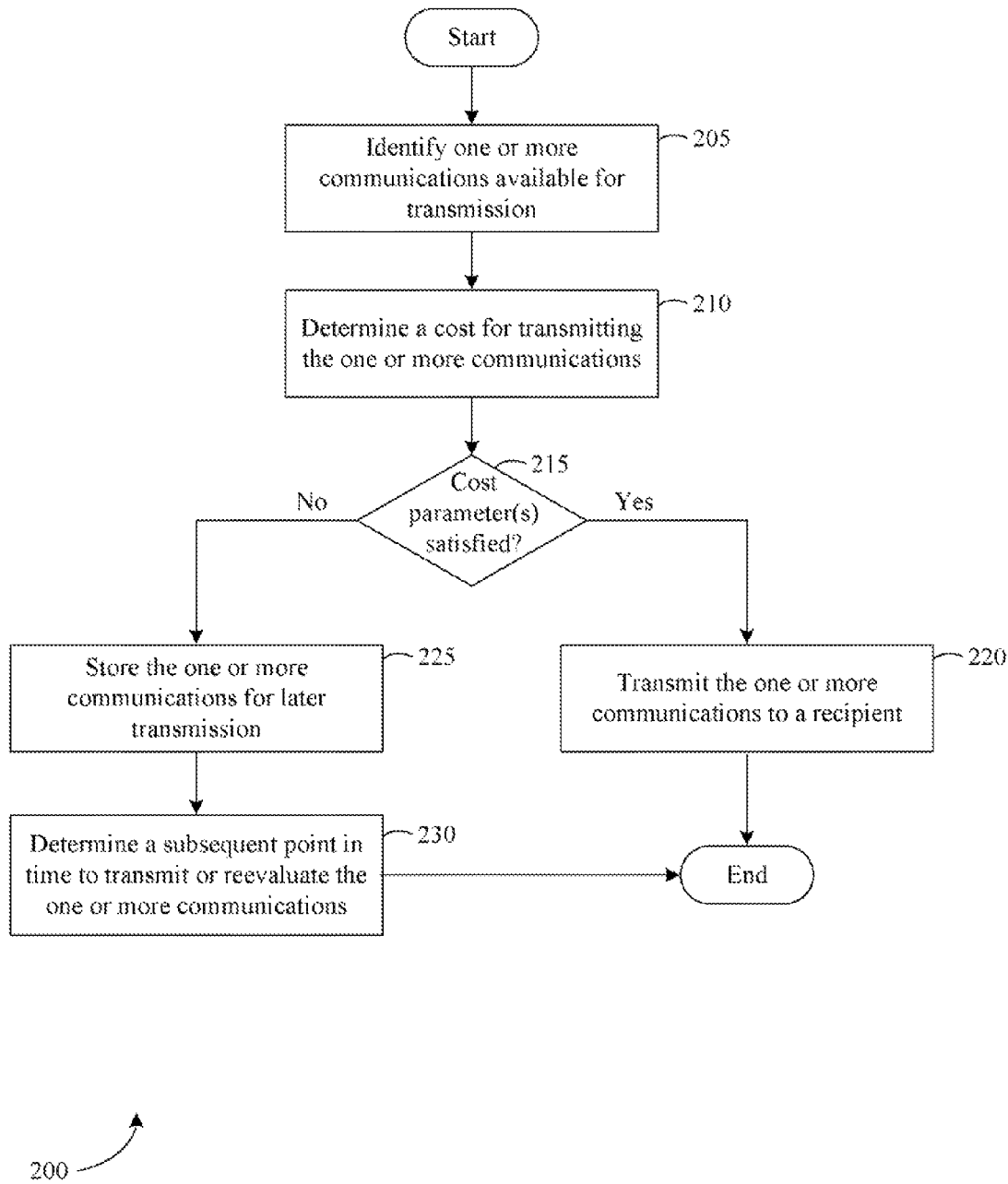

FIG. 2 is a flow diagram of an example method for processing communications by a utility meter, according to an illustrative embodiment of the invention.

Figure 3:
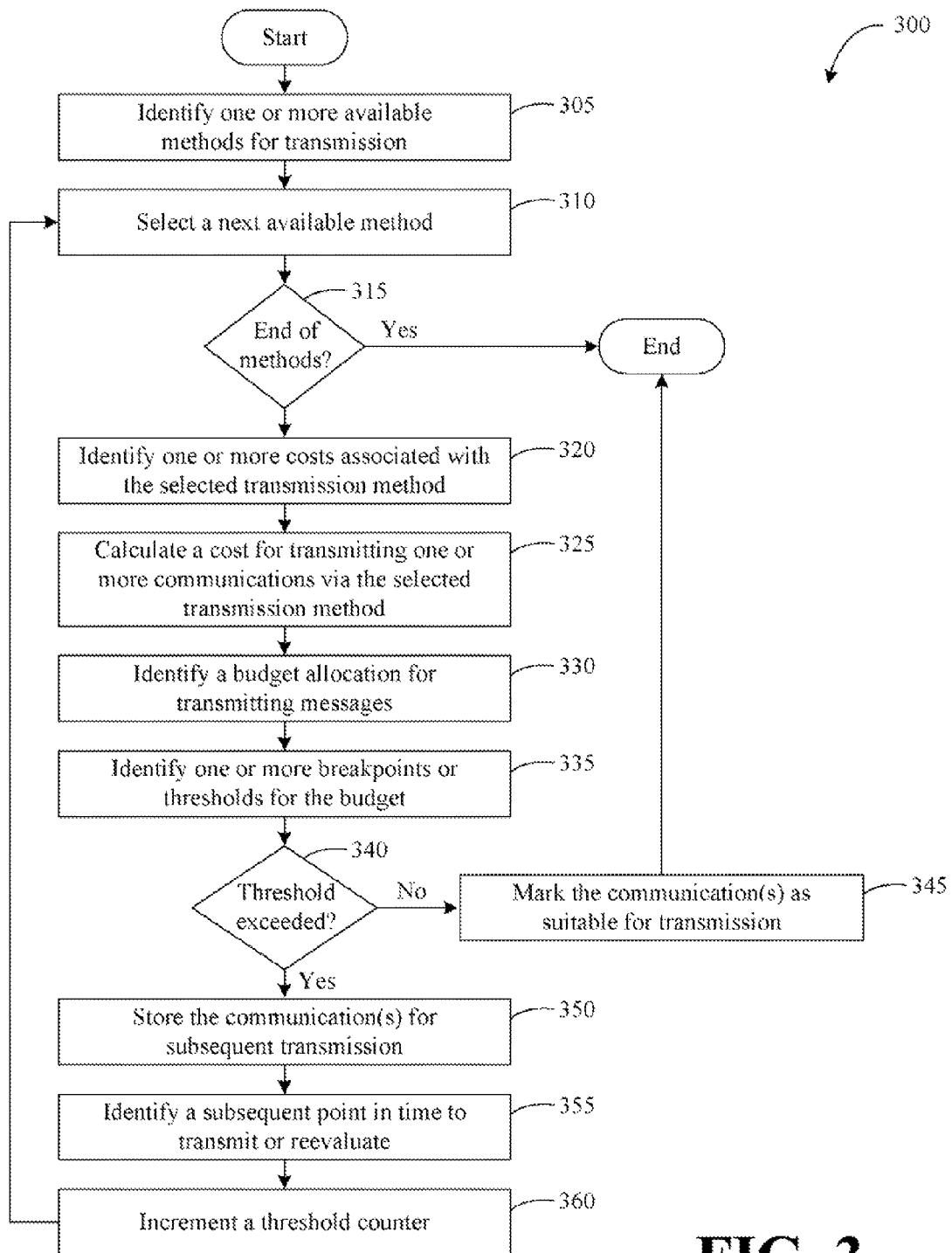

FIG. 3 is a flow diagram of an example method for determining whether one or more communications may be transmitted, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatus for facilitating utility meter communication. In one example embodiment of the invention, a utility meter may identify one or more communications to be transmitted by the utility meter to one or more recipients, such as a data collection server or utility service provider system. Following the identification of the communications, the utility meter may determine and/or calculate a cost associated with the transmission of the communications. A wide variety of factors may be evaluated as desired to determine a cost associated with the transmission of the communications, such as a bandwidth cost, a data transmission cost, a power cost, and/or a cost associated with a number of allowed communications.

Following the determination of a cost, the utility meter may determine whether the cost satisfies one or more cost parameters. If it is determined that the one or more cost parameters are satisfied, then the one or more communications may be transmitted to a recipient. If, however, it is determined that the one or more cost parameters have not been satisfied, then the one or more communications may be stored for subsequent transmission. A wide variety of suitable methods and/or techniques may be utilized to determine whether the cost satisfies one or more cost parameters. For example, an available budget for transmitting communications may be identified, and a determination may be made as to whether the cost satisfies the available budget. As another example, one or more thresholds associated with an available budget may be identified. A determination may then be made as to whether an identified threshold condition, such as a breakpoint within the available budget, has been reached or satisfied. If it is determined that the threshold condition has not been satisfied, then the communications may be approved for transmission. If, however, it is determined that the threshold condition has been satisfied, then a number of communications to be accumulated prior to transmission may be determined. A determination may then be made as to whether the one or more communications satisfy the accumulation threshold. In the event that a determination is made to store the one or more messages, a subsequent point in time for transmitting the communications, such as a point in time having a lower cost, may be determined.

In certain embodiments, the utility meter may identify a plurality of available methods for transmitting the one or more communications. Additionally, a respective cost may be determined for each of the available methods. A wide variety of transmission methods may be utilized as desired, such as a cellular transmission method, a Worldwide. Interoperability for Microwave Access ("WiMAX") transmission method, a power line carrier ("PLC") or broadband over power line ("BPL") transmission method, and/or a transmission method that utilizes a proprietary network. Each transmission method may be associated with different cost factors and, as desired, the cost associated with a plurality of transmission methods may be evaluated to determine whether to transmit the one or more communications.

Various embodiments of the invention may include one or more special purpose computers, systems, and/or particular machines that facilitate the utility meter communication. A special purpose computer or particular machine may include a wide variety of different software modules as desired in various embodiments. As explained in greater detail below, in certain embodiments, these various software components may be utilized to identify one or more communications to be transmitted, determine a cost associated with transmitting the communications, and determine whether the communications may be transmitted based upon the determined cost.

Certain embodiments of the invention described herein may have the technical effect of determining a cost associated with transmitting one or more utility meter communications. Additionally, embodiments of the invention may have the technical effect of evaluating the cost to determine whether the communications will be transmitted or stored for later transmission and/or combined with other communications. In this regard, the transmission cost incurred by the utility meter may be managed.

FIG. 1 is a block diagram of one example system 100 that facilitates utility meter communication, according to an illustrative embodiment of the invention. The system 100 illustrated in FIG. 1 may include a utility meter 105, one or more recipient devices 110, and/or one or more networks 115. The utility meter 105 may be configured to monitor utility usage for a structure, such as a residence or business. During the monitoring, one or more messages or other communications, such as alert messages and/or utility usage messages, may be generated by the utility meter 105. Additionally, in certain embodiments, one or more communications may be received by the utility meter 105 from other devices, such as home devices (e.g., power management devices, etc.) and/or other utility meters.

With reference to FIG. 1, the utility meter 105 may be any suitable utility meter that may be configured to communicate or transmit messages or other communications, such as a suitable electrical meter, water meter, or gas meter. As such, the utility meter 105 may be configured to measure an amount of utility usage (e.g., electrical usage, etc.) supplied to an associated residence, business, or machine. In certain embodiments, the utility meter 105 may be a smart meter or an advanced meter configured to identify consumption in relatively greater detail than a conventional meter. For example, a smart power meter may facilitate real-time or near real-time readings, power outage notifications, and/or power quality monitoring. In certain embodiments, the utility meter 105 may include one or more integrated communications circuits or communications devices. In other embodiments, the utility meter 105 may be associated with and/or in communication with one or more separate communications circuits or communications devices.

The utility meter 105 may include any number of suitable computer processing components that facilitate the general operation of the meter 105 and/or the evaluation of communications. Examples of suitable processing devices that may be incorporated into a utility meter 105 include, but are not limited to, application-specific circuits, microcontrollers, minicomputers, other computing devices, and the like. As such, the utility meter 105 may include any number of processors 121 that facilitate the execution of computer-readable instructions to control the operations of the utility meter 105 and the evaluation of communications for transmission. By executing computer-readable instructions, the utility meter 105 may include or form a special purpose computer that facilitates the identification of one or more communications, the determination of costs associated with the transmission of the communications, and/or the determination of whether the costs satisfy any number of transmission cost parameters.

In addition to one or more processor(s) 121, the utility meter 105 may include one or more memory devices 122, one or more network interface devices 123, and/or one or more sensors 124. The one or more memory devices 122 or memories may be any suitable memory devices, for example, caches, read-only memory devices, random access memory devices, magnetic storage devices, etc. The one or more memory devices 122 may store data, executable instructions, and/or various program modules utilized by the utility meter 105, for example, data files 125, stored messages 126, an operating system ("OS") 127, an operations module 128, and/or a communications module 129. The data files 125 may include, for example, information associated with the operation of the utility meter 105, measurements and/or readings data collected by the utility meter 105, information associated with alerts generated by the utility meter, information associated with a monitored structure, information associated with the generation and/or formatting of messages and/or communications, and/or information associated with designated recipients for communications. The stored messages 126 or stored communications may include any number of communications that have been generated and/or received by the utility meter 105 that are awaiting transmission by the utility meter 105. In certain embodiments, messages may be stored by the utility meter 105 following a transmission cost assessment for the messages. Additionally, as desired, messages may be combined by the utility meter 105 for subsequent transmission.

In certain embodiments of the invention, the utility meter 105 may include any number of software applications or modules that are executed to facilitate the operations of the utility meter 105. The software applications may include computer-readable instructions that are executable by the one or more processors 121. The execution of the computer-readable instructions may form a special purpose computer that facilitates the operations of the utility meter 105 as well as the evaluation of one or more communications. As an example of a software application, the utility meter 105 may optionally include an OS 127 that controls the general operation of the utility meter 105 and that facilitates the execution of additional software applications. Additionally, the utility meter 105 may include an operations module 128 or operations application. The operations module 128 may be a suitable software module configured to facilitate the receipt and processing of measurements data by the utility meter 105. In operation, the operations module 128 may receive measurements data from the sensors 124, and the operations module 128 may process the received measurements data. As desired, any number of messages associated with the measurements data, such as usage messages, may be generated by the operations module 128 for evaluation by the communications module 129 prior to transmission.

The communications module 129 or communications application may be a suitable software module configured to evaluate one or more communications and determine whether the one or more communications may be transmitted. In operation, the communications module 129 may identify one or more communications available for transmission. The communications module 129 may then determine a cost associated with transmitting the one or more communications to a recipient device 110. A wide variety of parameters may be evaluated by the communications module 129 to determine a cost, such as a size of the one or more communications, a time of day, and/or information associated with previously transmitted communications. Additionally, a wide variety of different costs may be determined, such as a bandwidth cost, a data transmission cost, a power cost, and/or a cost associated with a number of allowed communications (e.g., a number of allowed daily or monthly communications). In certain embodiments, the communications module 129 may identify a plurality of available communications methods, and a respective cost may be determined for each of the plurality of available communications methods.

Following the determination of a cost for transmitting one or more communications, the communications module 129 may determine whether the cost satisfies one or more cost parameters. If it is determined that the one or more cost parameters are satisfied, then the communications module 129 may direct or approve the transmission of the one or more communications. If, however, it is determined that the one or more cost parameters have not been satisfied, then the communications module 129 may direct the storage of the one or more communications for subsequent transmission. A wide variety of suitable methods and/or techniques may be utilized by the communications module 129 to determine whether the cost satisfies one or more cost parameters. For example, an available budget for transmitting communications may be identified, and a determination may be made as to whether the cost satisfies the available budget. As another example, one or more thresholds associated with an available budget may be identified. In other words, a step function or gradient approach for transmitting communications may be utilized. A determination may then be made as to whether an identified threshold condition, such as a breakpoint within the available budget, has been reached or satisfied. If it is determined that the threshold condition has not been satisfied, then the communications may be approved for transmission. If, however, it is determined that the threshold condition has been satisfied, then a number of communications to be accumulated prior to transmission may be determined. A determination may then be made as to whether the one or more communications satisfy the accumulation threshold. If the one or more communications satisfy the accumulation threshold, then the communications module 129 may approve the transmission of the one or more messages along with any stored accumulated messages.

In certain embodiments, if a determination is made to store one or more messages, the communications module 129 may determine or identify a subsequent point in time for reevaluating the communications and/or for transmitting the communications. For example, the communications module 129 may identify a lower cost point in time for transmitting the communications. As one example, a cellular communications method may, offer free communications during portions of a day (e.g., free nights and weekends). The communications module 129 may identify a free period as a point in time for transmitting, the communications. As another example, the communications module 129 may identify a point in time with relatively lower network traffic flow (e.g., a point in time that is relatively late at night) as a point in time for transmitting the communications. As yet another example, for PLC or BPL communications, the communications module 129 may identify a point in time with relatively lower electricity costs (e.g., an off-peak period) as a point in time for transmitting the communications.

Additionally, in certain embodiments, the communications module 129 may identify a priority level associated with identified communications. In the event that a communication has a relatively high priority, the communications module 129 may direct the transmission of the communication without performing a cost analysis. For example, an urgent alert message may be approved for transmission without performing a cost analysis. Alternatively, the results of a cost analysis may be disregarded. Other priority levels may be taken into account as desired to determine whether communications will be transmitted or stored.

One example of the operations that may be performed by the communications module 129 is described in greater detail below with reference to FIGS. 2 and 3.

The one or more network interface devices 123 may facilitate connection of the utility meter 105 to any number of suitable networks and/or transmission means. Examples of suitable network interfaces include, but are not limited to, cellular interfaces, WiMAX interfaces, PLC and/or BPL interfaces, cable modem interfaces, digital subscriber line ("DSL") interfaces, and/or any other suitable interfaces. As desired, any number of suitable communications cards, transceivers, transducers, adaptors, radios, and/or other devices may be utilized to interface the utility meter 105 to any number of suitable transmission networks. In certain embodiments, communications devices and/or communications circuits (e.g., cards, transceivers, transducers, etc.) may be included, incorporated, or integrated into the utility meter 105. In other embodiments, communications devices and/or communications circuits may be external to the utility meter 105 and connected to the utility meter 105 via any number of suitable plugs, pins, wires, and/or other connections.

The one or more sensors 124 may include any suitable sensor devices configured to collect measurements data associated with the operation of the utility meter 105. For example, the sensors 124 may include voltage sensors, current sensors, variable ampere reactive sensors, flow sensors, and/or other suitable devices configured to collect readings and/or other measurements. In this regard, usage data may be collected by the utility meter 105 for processing and/or output.

With continued reference to FIG. 1, any number of recipient devices 110 may be provided to receive communications transmitted by the utility meter 105. Examples of suitable recipient devices 110 include, but are not limited to, a central controller, a utility substation, and/or another utility meter. In certain embodiments, a recipient device 110 may include any number of suitable processing components that facilitate the receipt and processing of communications transmitted by the utility meter 105.

The one or more networks 115 may include any number of suitable networks that facilitate communications between the various components of the system 100, such as the recipient devices 110 and the utility meter 105. For example, the one or more networks 115 may include any number of suitable wide area networks, such as a cellular network, a broadband over power line network, a satellite-based network, a telephone network, a cable network, an Advanced Metering Infrastructure ("AMI") network, a proprietary network associated with a utility service provider, and/or any network in which network traffic is shared among a plurality of devices.

As desired, embodiments of the invention may include a system 100 with more or less than the components illustrated in FIG. 1. The system 100 of FIG. 1 is provided by way of example only.

FIG. 2 is a flow diagram of an example method 200 for processing communications by a utility meter, according to an illustrative embodiment of the invention. The method may be utilized in association with one or more utility meter systems, such as the system 100 illustrated in FIG. 1. In certain embodiments, the operations of the method 200 may be performed by at least one utility meter, such as the utility meter 105 illustrated in FIG. 1. The method 200 may begin at block 205.

At block 205, one or more communications available for transmission may be identified. The identified communications may include a wide variety of different types of communications, such as messages and/or alerts generated by the utility meter 105 and/or communications received by the utility meter 105 from any number of external devices, such as household devices (e.g., alarm systems, power management devices, smart household appliances, etc.) and/or other power meters.

At block 210, a cost for transmitting the one or more communications may be determined. As desired, a wide variety of parameters and/or factors may be evaluated to determine a cost, such as a size of the one or more communications, a time of day, and/or information associated with previously transmitted communications. Additionally, a wide variety of different costs may be determined, such as a bandwidth cost, a data transmission cost, a power cost, and/or a cost associated with a number of allowed communications (e.g., a number of allowed daily or monthly communications). One example of the operations that may be performed at block 210 to determine a transmission cost is described in greater detail below with reference to FIG. 3.

At block 215, a determination may be made as to whether the determined cost satisfies one or more cost parameters, such as spending parameters, bandwidth parameters, allowed communications parameters (e.g., a number of permitted communications in a month, etc.), and/or budget thresholds. One example of the operations that may be performed at block 215 to determine whether the cost satisfies one or more parameters is described in greater detail below with reference to FIG. 3. If it is determined at block 215 that the one or more cost parameters are satisfied, then operations may continue at block 220, and the one or more communications may be transmitted to a recipient, such as the recipient device 110 illustrated in FIG. 1. Operations may end following block 220.

If, however, it is determined at block 215 that the one or more cost parameters have not been satisfied, then operations may continue at block 225. At block 225, the one or more communications may be stored for subsequent transmission. In certain embodiments, the one or more communications may be stored for combination with other communications. At block 230, which may be optional in certain embodiments of the invention, a subsequent point in time for reevaluating the communications and/or for transmitting the communications may be determined. For example, a lower cost point in time for transmitting the communications (e.g., a non-peak time period, a free time period, etc.) may be determined.

The method 200 may end following either block 220 or block 230.

FIG. 3 is a flow diagram of an example method 300 for determining whether one or more communications may be transmitted, according to an illustrative embodiment of the invention. The method 300 illustrated in FIG. 3 may be one example of the operations of blocks 210 and 215 illustrated in FIG. 2. As such, the operations of the method 300 may be performed by at least one utility meter, such as the utility meter 105 illustrated in FIG. 1. The method 300 may begin at block 305.

At block 305, one or more available methods for transmitting one or more communications may be identified. A wide variety of transmission methods may be utilized as desired in various embodiments, such as a cellular transmission method, a WiMAX transmission method, a PLC or BPL transmission method, a cable modem transmission method, a DSL transmission method, and/or a transmission method that utilizes a proprietary network. In certain embodiments, the communications capabilities associated with the utility meter 105 may be evaluated in order to identify the one or more available transmission methods.

At block 310, a next available transmission method may be selected for processing and/or evaluation. At block 315, a determination may be made as to whether the end of the available transmission methods has been reached. If it is determined at block 315 that the end of the available transmission methods has been reached, then operations may end. If, however, it is determined at block 315 that the end of the available transmission methods has not been reached, then operations may continue at block 320.

At block 320, one or more costs associated with the selected transmission method may be identified. As desired in various embodiments of the invention, a wide variety of different costs may be identified and/or evaluated. Examples of suitable costs that may be identified include, but are not limited to, bandwidth costs, data transmission costs, a rate for the transmission, and/or power consumption costs. Additionally, a wide variety of other factors that might affect the cost analysis may be identified, such as a number of messages that may be communicated within a given time period (e.g., a number of messages included in a communications plan), various rates associated with time periods for transmission (e.g., peak rates, off-peak rates, etc.), and/or bandwidth limitations for the selected transmission method.

In certain embodiments, different transmission methods may be associated with different cost factors. For example, data transmission costs, data rates, and/or a number of messages allowed for a plan may be evaluated for a cellular transmission method. As another example, bandwidth limitations and/or a number of allowed messages may be evaluated for an Internet-based transmission method and/or a proprietary network-based transmission method. As yet another example, power cost (e.g., power consumption, power rates, etc.) may be evaluated for a PLC or BPL transmission method.

At block 325, a cost for transmitting the one or more communications via the selected transmission method may be calculated or otherwise determined. For example, a total cost for transmitting the one or more communications via the transmission method may be calculated from one or more individual cost factors. As another example, a cost may be calculated based upon an applicable rate (e.g., a data transfer rate, etc.) and a size and/or number of communications. As desired, the transmission cost may be expressed in a wide variety of different formats, such as a monetary cost, a number of allowed communications cost, and/or a bandwidth cost.

At block 330, a budget allocation for transmitting messages and/or communications may be identified. For example, a transmission budget allocation for the utility meter 105 may be identified. In certain embodiments, the budget allocation may be a total budget allocation for the utility meter 105. In other embodiments, a budget allocation that is specific to the selected transmission method may be identified. In yet other embodiments, both a total budget and a transmission method budget may be identified. As desired, a budget may cover a wide variety of different periods of time, such as a week, a month, and/or a year. Additionally, a budget may be expressed in a wide variety of different formats, such as a monetary format, an allowed bandwidth format, and/or an allowed number of messages format.

At block 335, which may be optional in certain embodiments of the invention, one or more breakpoints or thresholds associated with a budget may be identified. For example, one or more breakpoints associated with levels of spending, accumulated bandwidth over a given time period (e.g., the current month, etc.), and/or a number of transmitted messages over a given time period may be identified. As a result of utilizing one or more breakpoints, a step function or gradient approach may be used to transmit communications. For example, messages may be freely communicated until a first breakpoint is reached. Between the first breakpoint and a second breakpoint, a first number of messages (or given bandwidth or amount of data) will be accumulated prior to transmitting the messages. Between the second breakpoint and a third breakpoint, a second number of messages greater than the first number will be accumulated prior to transmission. This pattern may be continued as desired. Alternatively, other accumulation patterns may be utilized.

Following the identification of one or more breakpoints or thresholds at block 335, operations may continue at block 340. At block 340, a determination may be made as to whether a threshold has been exceeded. For example, a determination may be made as to whether a breakpoint has been reached. If it is determined at block 340 that a threshold has not been exceeded or reached, then operations may continue at block 345, and the one or more communications may be marked as suitable for transmission to a recipient. Operations may end following block 345.

If, however, it is determined at block 340 that a threshold has been exceeded or reached, then operations may continue at block 350. If a plurality of breakpoints have been reached, the most recently reached breakpoint may be identified. At block 350, the one or more communications may be stored for subsequent transmission. For example, the one or more communications may be stored in memory associated with the utility meter 105. As desired, the one or more communications may be stored with other communications (e.g., previously stored communications and/or subsequently identified communications) prior to the subsequent transmission of the one or more communications.

Additionally, when it is determined that a threshold limit has been reached, a parameter associated with accumulated communications (e.g., a bandwidth parameter, a number of messages parameter, etc.) may be evaluated. For example, once a threshold limit has been reached, a parameter may specify that communications will be transmitted once ten (10) communications have been accumulated. It will be appreciated that any number of communications or other accumulation criteria may be utilized. As desired, a determination may be made as to whether the identified one or more communications result in the parameter being satisfied. For example, a determination may be made as to whether the identified one or more communications result in the accumulation of ten (10) communications. If it is determined that the parameter has been satisfied, then the one or more communications and/or any stored communications may be marked as suitable for transmission. Otherwise, the one or more communications may be stored.

In certain embodiments, threshold limitations may be modified based upon the length of time that communications have been stored. In other words, the longer that one or more communications are stored and/or delayed, the higher the price that the utility meter 105 may be willing to incur for transmitting the communications. As one example, a threshold number of messages may be lowered over time as the same message(s) are stored. As another example, a cost threshold parameter associated with an acceptable cost for transmission may be lowered over time as the same message(s) are stored. In this regard, older communications may be cleared out from memory and/or buffers.

At block 355, which may be optional in certain embodiments of the invention, a subsequent point in time for transmitting or reevaluating the one or more communications may be identified. For example, a subsequent point in time at which the selected transmission method has a lower cost (e.g., a free transmission period, a time associated with lower network traffic, a time period associated with lower electricity cost, etc.) may be identified. The one or more communications may then be marked for transmission or reevaluation at the identified subsequent point in time.

At block 360, which may be optional in certain embodiments of the invention, a counter or parameter associated with the threshold may be incremented. For example, a counter associated with a number of accumulated messages may be incremented. In this regard, when subsequent communications are evaluated, a determination may be made as to whether an accumulated communications parameter has been satisfied. Operations may then continue at block 310, and a next available transmission method may be selected for evaluation.

The method 300 may end following either block 315 or block 345.

The operations described and shown in the methods 200, 300 of FIGS. 2 and 3 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2 and 3 may be performed.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising:
    identifying, by a utility meter, one or more communications to be transmitted by the utility meter;
    determining, by the utility meter, a cost associated with the transmission of the one or more communications;
    determining, by the utility meter, whether the cost satisfies one or more cost parameters; and
    transmitting, by the utility meter if it is determined that the cost satisfies the one or more cost parameters, the one or more communications; or
    storing, by the utility meter if it is determined that the cost does not satisfy the one or more cost parameters, the one or more communications for subsequent transmission.

2. The method of claim 1, wherein determining a cost associated with the transmission comprises determining one or more of (i) a bandwidth cost, (ii) a data transmission cost, (iii) a power cost, or (iv) a cost associated with a number of allowed communications.

3. The method of claim 1, wherein determining whether the cost satisfies one or more cost parameters comprises:
    identifying an available budget for transmitting communications; and
    determining whether the cost satisfies the available budget.

4. The method of claim 1, further comprising:
    identifying, by the utility meter, a threshold associated with an available budget for transmitting communications;
    determining, by the utility meter, that a condition associated with the identified threshold has been satisfied; and
    determining, by the utility meter based upon the determination that the condition has been satisfied, a number of communications to be accumulated prior to transmission,
    wherein determining whether the cost satisfies one or more cost parameters comprises determining whether the number of communications is satisfied by the one or more communications.

5. The method of claim 4, wherein it is determined that the number of communications is not satisfied by the one or more communications, and further comprising:
    incrementing, by the utility meter, a counter associated with the accumulation of communications.

6. The method of claim 1, further comprising:
    identifying, by the utility meter, a plurality of available methods for transmitting the one or more communications,
    wherein determining a cost associated with the transmission comprises determining a respective cost associated with each of the plurality of available methods.

7. The method of claim 6, wherein identifying a plurality of available methods comprises identifying one or more of (i) a cellular transmission method, (ii) a Worldwide Interoperability for Microwave Access (WiMAX) transmission method, (iii) a power line carrier (PLC) transmission method, or (iv) a transmission method that utilizes a proprietary network.

8. The method of claim 1, further comprising:
    determining, by the utility meter, a subsequent point in time at which the one or more communications will be transmitted.

9. The method of claim 8, wherein determining a subsequent point in time comprises determining a point in time having a lower cost for transmitting the one or more communications.

10. The method of claim 1, further comprising:
    combining, by the utility meter, the one or more communications with one or more additional communications prior to the transmission of the one or more communications.

11. A utility meter, comprising:
    at least one network interface device configured to facilitate transmission of one or more communications;
    at least one memory configured to store computer-executable instructions; and
    at least one processor configured to access the at least one memory and execute the computer-executable instructions to:
        identify one or more communications to be transmitted by the utility meter;

determine a cost associated with the transmission of the one or more communications;

determine whether the cost satisfies one or more cost parameters; and direct, if it is determined that the cost satisfies the one or more cost parameters, transmission of the one or more communications by the at least one network interface; or direct, if it is determined that the cost does not satisfy the one or more cost parameters, storage of the one or more communications in the at least one memory for subsequent transmission.

12. The utility meter of claim 11, wherein the determined cost associated with the transmission comprises one or more of (i) a bandwidth cost, (ii) a data transmission cost, (iii) a power cost, or (iv) a cost associated with a number of allowed communications.

13. The utility meter of claim 11, wherein the at least one processor is configured to determine whether the cost satisfies one or more cost parameters by executing the computer-executable instructions to:

identify an available budget for transmitting communications; and determine whether the cost satisfies the available budget.

14. The utility meter of claim 11, wherein the at least one processor is further configured to execute the computer-executable instructions to:

identify a threshold associated with an available budget for transmitting communications;

determine that a condition associated with the identified threshold has been satisfied; and determine, based upon the determination that the condition has been satisfied, a number of communications to be accumulated prior to transmission; and determine whether the cost satisfies one or more cost parameters by determining whether the number of communications is satisfied by the one or more communications.

15. The utility meter of claim 14, wherein the at least one processor determines that the number of communications is not satisfied by the one or more communications, and wherein the at least one processor is further configured to execute the computer-executable instructions to increment a counter associated with the accumulation of communications.

16. The utility meter of claim 11, wherein the at least one processor is further configured to execute the computer-executable instructions to:

identify a plurality of available methods for transmitting the one or more communications; and determine a cost associated with the transmission by determining a respective cost associated with each of the plurality of available methods.

17. The utility meter of claim 16, wherein the plurality of available methods comprise one or more of (i) a cellular transmission method, (ii) a Worldwide Interoperability for Microwave Access (WiMAX) transmission method, (iii) a power line carrier (PLC) transmission method, or (iv) a transmission method that utilizes a proprietary network.

18. The utility meter of claim 11, wherein the at least one processor is further configured to execute the computer-executable instructions to:

determine a subsequent point in time at which the one or more communications will be transmitted.

19. The utility meter of claim 18, wherein the determined subsequent point in time comprises a point in time having a lower cost for transmitting the one or more communications.

20. The utility meter of claim 11, wherein the at least one processor is further configured to execute the computer-executable instructions to:

combine the one or more communications with one or more additional communications prior to the transmission of the one or more communications.

* * * * *